United States Patent Office 3,445,258
Patented May 20, 1969

3,445,258
BITUMINOUS EMULSIONS
Richard L. Ferm, El Cerrito, and Russell F. Boynton, Orinda, Calif., assignors to Chevron Research Company, a corporation of Delaware
No Drawing. Filed Oct. 19, 1964, Ser. No. 404,930
Int. Cl. C08h 13/00
U.S. Cl. 106—277                                                         3 Claims The present invention relates to the production of improved oil-in-water-type bituminous emulsions. More particularly, it relates to the production of cationic oil-in-water-type emulsions of bitumen emulsified in water with the aid of a nitrogenous emulsifier and containing a novel additive which enhances unexpectedly and substantially the coating ability of such emulsions. More specifically, the invention relates to the production of the so-called "mixing-grade" oil-in-water type cationic bituminous (usually asphalt) emulsions of from about 50 to about 75 percent by weight bituminous residue, eminently suitable for use in paving applications when mixed with mineral aggregate, for instance, with sand and, in particular, with various kinds of difficult-to-coat densely-graded fine aggregate, such as pit-run, crusher-run, and the like, i.e., aggregates containing a substantial proportion (up to 20 percent by weight) of fine particles passing through No. 200 mesh sieve. At the present time, and particularly in the United Sstates, asphalt constitutes the preferred bituminous binder component for the preparation of paving oil-in-water-type bituminous emulsions.

Compared with bituminous emulsions formulated with the aid of anion-active emulsifying agents, such as soaps and alkali-metal bases (the latter being used to emulsify in situ inherently acid and purposely acidified bitumens), emulsions prepared with cation-active emulsifying agents are relative newcomers in the paving art. However, their effectiveness on difficult-to-coat electronegative aggregates, i.e., mainly siliceous aggregates, and their usually rapid initial set, concurrent with a lesser risk of their being washed off by rainfall, soon prompted the paving industry to accept and to use increasingly these cationic emulsions in paving work. There they were soon found to be not only competitive with, but often preferred to, anionic emulsions.

Among the several classes of cation-active materials capable of emulsifying bitumen, and in particular asphalt, there may be named salts of primary aliphatic amines known in the trade under the trademark designation of "Armeens"; usually their acetates are sold under the trademark "Armacs." There are also available as emulsifiers various quaternary ammonium salts, for instance, N-alkyl benzyl-N,N,N-trimethyl ammonium chloride and N-alkyl benzyl-N,N-diethyl-N-ethanolamine chloride, sold under the trademarks "ATM–50" and "ADE–50." One may also use as cation-active emulsifiers to prepare cationic paving bituminous emulsions the several alkyl trimethyl ammonium chlorides and bromides obtained by corresponding acidification of quaternary bases sold in the trade under the trademark designation of "Arquads." Examples of these are "Arquad T" and "Arquad S," derived from tallow and soybean oil, respectively. Salts (halides, acetates, and the like) of materials of the N-alkyl trimethylene diamine type, sold under the trademark designation of "Duomeens" also can be used as emulsifiers in formulating cationic paving emulsions. Another example of cation-active emulsifiers for this purpose is offered by salts of substituted imidazoline (glyoxalidine) type materials sold under the trademark designation of "Nalcamine," a specific instance being "Nalcamine G–39M," a 1-(2-aminoethyl)-2-n-alkyl-2-imidazoline in which the alkyl group contains 17 carbon atoms. Also suitable as cation-active emulsifiers are salts of ethylene oxide adducts of fatty diamines sold under the trademark designation of "Ethoduomeens," of ethylene oxide adducts of primary fatty amines sold under the trademark of "Ethomeens," and of ethylene oxide adducts of hydrocarbon-substituted imidazolines (glyoxalidines). Another suitable cationic emulsifier type is represented by water-soluble tertiary-alkyl aminopolyether alcohol materials available in commerce under the trademark designation of "Priminox."

Though successfully competitive with anionic bituminous emulsions, the cationic bituminous emulsions, particularly those of asphalt, do display certain drawbacks with respect to their applications in the paving work. Aside from the fact that, as a rule, the cation-active emulsifying components are still more expensive than anionic emulsifiers, it is not easy to achieve, in using these cation-active components for preparing mixing-grade paving emulsions, the desired delicate balance of good storage stability, pumping stability, and mixing stability of the emulsion and at the same time to obtain a good coating of the entire (or substantially entire) surface of the aggregate before the emulsion breaks, so that this coating adheres and persists on adhering firmly to said surface. In fact, the behavior of bituminous emulsions prepared with different emulsifiers is rather erratic and often impossible to predict. This is particularly true if the aggregate, especially the dense-graded aggregate, is wet. That is why some emulsifiers require concurrent use of inorganic salt additives to secure satisfactory performance and coating of bituminous emulsions prepared therewith. For instance, quaternary ammonium salts, when used in cationic bituminous emulsions intended for use in mixes with dense-graded aggregate in the construction of base or surface courses, even though effective as emulsifiers, fail to secure a satisfactory coating of the bituminous binder on the aggregate unless an unduly high amount of such salt emulsifier is used, and this is clearly an uneconomical expedient. Cationic emulsions prepared by emulsifying bitumen with acetates of primary fatty amines, the "Armacs," have been noted to have poor mechanical stability. The same is true of emulsions formulated with other salts of primary amine emulsifiers, such as salt of dehydroabietylamine derived from rosin, e.g., an acetate available in commerce under the trademark "Polyrad." These emulsions additionally lack the viscosity desired for paving work purposes.

Thus, a cation-active or "cationic" emulsifier alone does not necessarily insure a satisfactory emulsion performance and a good coating of the aggregate.

The present invention as described hereinafter, first of all, offers to the paving art improved bituminous paving emulsions, preferably cationic asphalt paving emulsions, containing a new and effectivve additive material, which added in small amounts from about 0.10 to about 10.0 percent, preferably from about 0.2 to about 5.0 percent and desirably from about 0.2 to about 2.0 percent by weight, based on the weight of the finished emulsion, significantly enhances the coating ability and performance thereof in mixes of bituminous emulsions with dense-graded aggregate, sand, etc. This additive, responsible for the improved coating ability of bituminous emulsions, is a basic nitrogen-containing material obtainable in the distillation of gilsonite (uintaite), a naturally occurring asphaltic mineral consisting of hydrocarbons and mainly found in Eastern Utah and Western Colorado. On distilling the gilsonite at the refinery into the cuts of light gas oil, heavy gas oil, and fractionator bottoms, and/or extracting these cuts with acid, a concentrate of basic nitrogen-containing compounds, the so-called "gilsonite amine production oil" is obtained. This oil is mainly composed of gilsonite nitrogen bases, which are primarily basic nitrogen-containing compounds with a pyridine-type nucleus, and it represents a mixture of mainly alkylated pyridines and quinolines, and some pyrroles. A typical "gilsonite amine oil concentrate" has the following characteristics:

| | | |
|---|---|---|
| Gravity, deg. API at 60° F. | | 18.4 |
| Distillation, ASTM D–158 at 760 mm., vol. percent: | | |
| Start | °F | 366 |
| 10 | °F | 433 |
| 50 | °F | 487 |
| 50 | °F | 530 |
| 70 | °F | 585 |
| 90 | °F | 688 |
| End point | °F | 703 |
| Molecular weight average (est.) | | 193 |
| Refractive index at 25° C | | 1.5268 |
| Pour point | °F | 10 |
| Flash, P.M. | °F | 180 |
| pH (1:5 in titration solvent) | | 7.30 |
| Kinematic viscosity at— | | |
| 77° F | cs | 10.34 |
| 100° F | cs | 6.20 |
| 122° F | cs | 4.40 |
| 140° F | cs | 3.24 |
| 180° F | cs | 2.33 |
| Nitrogen: | | |
| Basic | percent | 2.57 |
| Total | do | 3.39 |
| Sulfur (Parr bomb) | do | 1.77 |
| Unsulfonated residue (ASTM D483–52T) | do | 61.9 |
| Color | | Dark |
| Odor | | Pyridine-like |

The gilsonite nitrogen bases, according to the present invention, may be added to bituminous emulsions either as such or in the form of a quaternary derivative thereof. In other words, they may be also added to the emulsion in the form of a quaternary nitrogen-containing product obtained by reacting the gilsonite amine (pyridine) base material with a suitable quaternizing agent. The quaternization reaction may be carried out in a known manner, following, for instance, the general teachings of U.S. Patent No. 2,678,316, issued to B. R. Harris, who described various methods of quaternizing tertiary amines, including heterocyclic amines, such as are found in the gilsonite nitrogen base concentrates of "gilsonite amine oil."

In a preferred practice of the invention, such reaction is usually carried out on a 1:1 equivalent basis. More preferably, however, an excess of quaternizing agent should be present to drive the reaction to completion. Form 5 percent to about 25 percent excess quaternizing agent over the theoretical amount generally gives best results in terms of completeness of reaction.

The organic quaternizing reactant may be chosen from a host of known organic alkylating reagents. For example, dimethyl sulfate; methyl chloride; $C_2$–$C_{22}$ alkyl halides, such as ethyl chloride, propyl chloride, etc.; alkaryl halides, such as benzyl chloride; substituted benzyl chlorides, such as dodecyl benzyl chloride; epihalohydrins, such as epichlorohydrin; sultones; oxiranes; lactones, such as β-propiolactone; polyoxy-alkylene halides, such as polyoxyethylene chloride, etc., may be employed. Preferred quaternizing agents are alkyl halides; alkyl-substituted aryl halo-compounds, such as alkyl-substituted benzyl halides and alkoxy halides. Of these, benzyl chloride and dodecyl benzyl chloride are most preferred.

The quaternization reaction itself may be effected in bulk without benefit of solvent or in a variety of polar organic solvents, such as alcohols, ketones, esters, etc. The quaternary product may be used as an asphalt additive in a 100 percent active form or in solution state.

The quaternary amines of the invention may be thus described as products formed by reaction of an organic quaternizing agent and the "amine oil fraction" derived from gilsonite bitumen. In more detail, the preferred quaternary amines of the invention have a structural formula:

where R' is an organic radical derived from an organic quaternizing agent and selected from the group consisting of alkyl, alkyl-substituted aryl and alkoxy, $R_3N$—is a radical derived from the "amine oil" or nitrogen base concentrate which has been produced as an overhead distillate of gilsonite bitumen, said "amine oil" having a total nitrogen content of 1.5 to 10.0 percent, a distillation range of about 300 to 750° F. and an average molecular weight of 180 to 220. A in this formula is the anion of said quaternizing agent.

The aforementioned gilsonite-derived nitrogen bases and/or their quaternary salts can be used, according to the invention, to enchance the coating ability of paving bituminous emulsions formulated by dispersing bitumen in water with the aid of usual amounts of from about 0.15 to about 2.0 percent by weight of compatible emulsifiers, which may be either cationic, anionic, or non-ionic.

In a preferred embodiment of the present invention, gilsonite nitrogen bases and their quaternary amine salts, when incorporated into asphalt-in-water emulsions, formulated with nitrogenous emulsifiers, enhance the adhesion of bitumen to aggregate and markedly increase the coating of the aggregate by the asphalt so as to coat the aggregate surface substantially completely and in all events at least 70 percent of the surface. When incorporated into an asphalt emulsion, the gilsonite nitrogen bases or their corresponding "quaternaries" may be varied in amounts ranging from about 0.10 percent to about 10.0 percent based on the total weight of the emulsion. Preferably, the content of the gilsonite bases and/or their quaternary salts will range from about 0.2 percent to about 5.0 percent by weight, based on the total emulsion. For practical purposes, amounts from about 0.2 percent to 2.0 percent are most desirable.

The gilsonite nitrogen bases or quaternary salts thereof may be first added to a nitrogenous emulsifier (either cation or nonionic), which combination in turn is added to the asphalt and water mixture, and the whole is subsequently emulsified by conventional means, as by blending in a colloid mill. Likewise, the emulsifier may be first added to bitumen and water to form the appropriate emulsion, followed by addition of the gilsonite-derived additive. The reverse procedure may also be effected. The most preferred method of forming such emulsion is by dispersion of the two additives into the emulsifying water, followed by emulsification of the asphalt in the resulting aqueous phase containing these two chemical additives. In any case, for best results, the combination of the nitrogenous emulsifier and the gilsonite additive should preferably be made up of 40 to 80 percent by weight of such emulsifier and 20 to 60 percent by weight of gilsonite additive, either as a nitrogen base or as a quarternary salt thereof, based on a total composition comprising both substances. When the emulsifier and the additive are added separately to make up an asphalt-in-water emulsion, the just-mentioned ratios of the nitrogenous emulsifier to the coating-aid additive, when present in the emulsion, are still valid.

The above-descrbed gilsonite nitrogen bases and quaternaries may be used in combination with any compatible emulsifier without adversely affecting the emulsifying power of the particular surface-active chemical.

A series of tests illustrating the effectiveness of gilsonite-derived nitrogen bases or "gilsonite amine oil" as such, that is, unquaternized, in cationic mixing-grade asphalt paving emulsions, as additives enhancing the coating ability thereof was carried out as follows: An emulsion of 65 percent by weight of a Venezuelan (Boscan) asphalt (200 to 300 penetration), prepared with 0.5 percent by weight, on 100 percent active basis, of the quaternary chloride salt of tallow trimethyl ammonium base sold under the trademark "Arquad T-50" as an emulsifier, received an addition of 2 percent by weight of the gilsonite nitrogen-base light gas oil distillate. The pH of the emulsifying water was equal to 10.0. The emulsion was then tested for coating ability, the test consisting in placing 500 g. of a dense-graded, difficult-to-coat, mineral aggregate of California origin (Cache Creek), which contains up to 6 percent by weight of fines passing through the No. 200 mesh sieve, into a laboratory mixer actuated by an electric motor at a speed of 190 to 200 r.p.m. and provided with a blade stirrer. About 7 percent by weight of water (35 g.) was then added to the aggregate to moisten it, and this was followed by the addition of about 6 percent by weight (32 g.) of the asphalt emulsion which has been preblended with 15 percent by weight of naphtha. The contents of the mixer were stirred for one minute and then dumped into a pan where the mix was spread out flat. The coating was observed visually immediately thereafter, and again after having been left at rest overnight. The coating of the aggregate was rated to be very good, the portion ranging in size from 3/8" and larger being coated at least 70 percent, while the portion of the aggregate 3/8" and finer in size was coated at least 75 percent. The color of the mix was black, and the cohesion also was very good. These results were in sharp contrast with the results of a similar observation of the coating ability of the same emulsion, in which, however, the gilsonite nitrogen bases were omitted from the composition. In this case, only about 40 percent of the aggregate surface was coated.

The coating effectiveness of the emulsions formulated in accordance with the invention was again demonstrated in a series of tests which involved making an emulsion of a like Venezuelan (Boscan) asphalt of 200/300 penetration, by dispersing 65 percent by weight of this asphalt in water which contained 0.5 percent by weight of a quaternary tallow trimethyl ammonium chloride (Arquad T-50) and 2 percent by weight of a nitrogen base concentrate from the distillation of gilsonite light gas oil, the concentrate boiling between 435 to 708° F. (ASTM D-158) and having a total nitrogen content of 8.11 percent.

When tested by mixing 32 g. of this emulsion blended with 15 percent of cutter stock naphtha with 500 g. of an aggregate of Oregon origin (so-called "Wildish aggregate"), prewetted with 7 percent of water, the coating of the aggregate surface mounted to 85 percent for the portion from 3/8" and larger in size, and 95 percent for the portion 3/8" and finer in size.

In a similar test, again with the same Venezuelan asphalt emulsion, using the same proportions of water (7 percent) for prewetting the aggregate and the same proportions of naphtha (15 percent) for diluting the emulsion, but only 5 percent of a gilsonite light gas oil distillate boiling from 366 to 903° F. (ASTM D-158) and containing 3.39 percent of nitrogen, the coating of the aggregate, a dense-graded California aggregate (Cache Creek), was 95 percent.

Particularly satisfactory coating performance is observed in the case of cationic mixing-grade bituminous (asphalt) emulsions formulated with a California (San Ardo) asphalt of 85/100 penetration containing about 15 percent by weight of naphtha to assist in coating the surface of the aggregate. The asphalt residue of the emulsion was equal to about 65 percent by weight. It was dispersed in water with the aid of a mixture of the gilsonite quaternary salt, prepared by quaternization with dodecyl benzyl chloride as described hereinbefore, and a tallow diamine sold under the trademark of "Formonyte 802," together with N-polyethoxy rosin amine material sold under the trademark "Polyrad 1110." The emulsion had the following composition:

| | Percent |
|---|---|
| Asphalt | 70.0 |
| Tallow diamine | 0.284 |
| Gilsonite quaternary | 0.138 |
| Polyrad | 0.057 |
| Hydrochloric acid in amount giving a pH of 6.5 | 0.165 |
| Water | 29.356 |
| Total | 100 |

The results of the coating test, carried out as described in the previous examples, confirmed formation of a good coating (more than 75 percent) on the surface of dense-graded aggregate, which in this instance was again of California origin (Cache Creek).

Particularly satisfactory coating performance is observed in the case of cationic mixing-grade asphalt emulsions formulated with water-soluble salts of ethylene oxide adducts of basic nitrogen-containing (nitrogenous) materials as the emulsifiers. One example of such emulsifiers being ethoxylated is tertiary-alkyl amino polyether alcohols sold under the trademark of "Priminox" by Rohm & Haas Company, of Philadelphia, Pa. When gilsonite nitrogen bases and/or their quaternary salts are used in formulating the emulsions emulsified with an ethylene oxide adduct of the "Priminox" type, the coating of the dense-graded aggregate is unexpectedly enhanced.

It is particularly true of asphalt emulsions formulated with ethylene oxide adducts of basic nitrogen-containing materials from the group represented by one of the following structures:

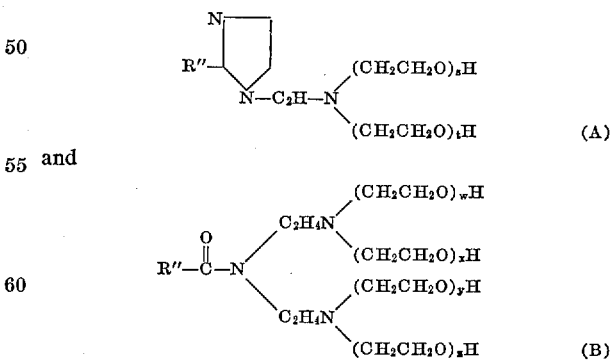

wherein R" is an alkyl radical containing 7 to 21 carbon atoms, $s$ and $t$ are integers whose total number ranges from about 30 to about 60, and $w$, $x$, $y$ and $z$, are integers whose total also ranges from about 30 to about 60.

These materials are obtained by ethoxylating hydrocarbon-substituted imidazolines (glyoxalidines), such as those sold in commerce under the trademark "Nalcamine." Generally, glyoxalidines with an acyclic aliphatic hydrocarbon substituent (preferably of 11 to 17 carbon atoms)

in the 2-position on the glyoxalidine ring, when ethoxylated with from about 10 to about 90 moles and preferably from 30 to 70 moles of ethylene oxide, are particularly suitable for the preparation of cationic bituminous emulsions of improved coating ability in accordance with the invention. Apparently, in the course of ethoxylation, depending on the reaction conditions, the glyoxalidine (imidazoline) ring can become opened and Structure B then results instead of, or concurrently with, the formation of materials of Structure A.

The effectiveness of these particular preferred paving emulsions is made apparent by the following illustrative data from a series of tests in which a California asphalt of 85/100 penetration (San Ardo) was emulsified in water using a quaternary chloride salt nitrogen base gilsonite concentrate, this quaternary being obtained by quaternization of gilsonite amine oil with dodecyl benzyl chloride. The emulsification was carried out with the aid of the adduct of 50 moles of ethylene oxide and a substituted imidazoline, namely, 1-(2-aminoethyl)-2-n-heptadecenyl-2-imidazoline, sold under the trademark designation of "Nalcamine G–39M." The pH of the emulsifying water was equal to 1.5 .

The emulsion was made up as follows:

|  | Percent |
|---|---|
| Asphalt | 70.0 |
| Gilsonite quaternary | 0.138 |
| Ethoxylated imidazoline | 0.341 |
| Hydrochloric acid, 20° Bé. (31.5% conc.) | 0.165 |
| Water | 29.356 |
| Total | 100 |

The coating test was again carried out as described above in the several preceding examples: 500 g. of a dense-graded aggregate of California origin (Cache Creek) containing up to 6 percent of fines passing through No. 200 mesh sieve was charged into a laboratory mixer driven by an electric motor at a speed of 190 to 200 r.p.m. and provided with a blade stirrer. Approximately 2½ percent by weight of water was added and distributed within the aggregate charge, followed by about 6 percent by weight of the above-identified asphalt emulsion. Then the contents were stirred for one minute and dumped into a pan and finally spread out flat. The coating was observed visually immediately thereafter and again after leaving the spread mix alone overnight. The coating of the aggregate was rated to be excellent (more than 85 perecnt of the surface coated).

In another series of tests carried out under essentially the same conditions but using a like California dense-graded aggregate (Cache Creek) containing more fines, namely at least 9 percent passing through No. 200 mesh sieve and accordingly expected to be more difficult to coat, the coating observed on the aggregate 24 hours after the test was found to be very good (at least 75 percent of the surface coated).

In all of the tests described in this specification, addition of naphtha cutter stock in amounts conventionally employed in paving emulsions, that is, from about 2.0 to about 20 percent by weight, would further assist completeness of coating, particularly if the aggregate is dry or only slightly damp.

A further demonstration of the coating effectiveness of the paving emulsions prepared according to the present invention, that is, so as to contain gilsonite nitrogen bases and/or their corresponding quaternary salts, was obtained in the series of tests carried out on a variety of dense-graded aggregates. The emulsion used in these tests was formulated with the aid of particularly preferred formulation of the invention which comprised an ethoxylated glyoxalidine (imidazoline) type emulsifier, namely, an adduct of 50 moles of ethylene oxide and trademarked material "Nalcamine G–39M" mentioned hereinbefore, and the gilsonite-derived quaternary additive prepared as indicated hereinbefore by quaternization of gilsonite amine oil with dodecyl benzyl chloride.

The formulation included:

|  | Percent |
|---|---|
| California asphalt (San Ardo), penetration 85/100 | 70.0 |
| Ethylene oxide adduct | 0.341 |
| Gilsonite quaternary | 0.138 |
| Hydrochloric acid to give an acid pH of 1.5 to the emulsifying water | 0.165 |
| Water | 29.356 |
| Total | 100 |

The ethylene oxide adduct, the quaternary additive, and the acid were dispersed in the emulsifying water, which was then used to emulsify the asphalt in a colloid mill.

The aggregates tested were the following:

(1) The previously mentioned California (Cache Creek) dense-graded aggregate containing as much as 6 percent of fines passing through No. 200 mesh sieve;

(2) Pit-run aggregate ranging in size from ¾" and finer from Borton Pit, Clackames County, Oreg.;

(3) Aggregate varying in size from ⅝" and finer from Salmon, Idaho;

(4) An aggregate ranging in size from ¾" and finer from Monroe Road Quarry in Spokane County, Wash.; and (5) A so-called "Saint Helena" paving aggregate (sizes from ½" and finer) from Columbia County, Oreg.

In each test, the aggregate was prewetted with from 1 to 5 percent by weight of water. No naphtha was used. The observation immediately after the coating of the damp aggregate and 24 hours later revealed an excellent coating of tthe aggregates by asphalt (higher than 70 percent of the entire surface). In the absence of prewetting with water, the use of naphtha in conventional amounts (2.0 to 20.0 percent) does aid in achieving the desired degree of coating.

Finally, a coating test was run using the combination of 1 percent of a commercial quaternary material sold under the trademark of "Arquad T–50," as the primary emulsifier, and 2 percent of gilsonite nitrogen bases, the whole dispersed in the emulsifying water (35 g.). The water was then used to emulsify 65 percent of a Venezuelan (Boscan) asphalt of 20 to 300 penetration, and 32 g. of the resulting emulsion, blended with 15 percent by weight of naphtha, was then applied to coat 500 g. of California (Cache Creek) aggregate containing up to 9 percent by weight of fines passing through No. 200 mesh sieve. The surface of the portion of the aggregate ⅜" and larger in size was observed to be coated 80 percent and that of the aggregate ⅜" and finer in size was coated 90 percent, as shown by the observations made immediately following the tests and 24 hours thereafter.

In contrast therewith, in the absence of the gilsonite nitrogen-base additive, the above two ratings were 70 percent and 30 percent, respectively.

As can be seen from the specification offered hereinbefore, the present invention is concerned with improvements in cationic bituminous emulsions, and more specifically in cationic asphalt emulsions, eminently suitable for use in mixes with mineral aggregates containing substantial proportions of fines, such as sand and dense-graded aggregates, heretofore considered to be difficult materials to coat. The broad terminology "cationic bituminous or asphalt emulsions" is accepted in the art to refer to an emulsion in which the particles or droplets of bitumen or asphalt carry positive charges. The exact nature of the phenomenon underlying the improvement in the coating ability of cationic bituminous emulsions in accordance with the present invention is not completely understood. However, it is believed that this improvement is predicated on simultaneous presence in the emulsion of an efficient cationic surface-active agent and a material which partakes of the nature of a so-called Lewis base and is capable of donating electrons. Such latter material may be a polyamine, a polyether, and the like. The efficient surface-active agent which has its hydrophobic grouping on the cation may be either an acid salt of an amine or a quaternary nitrogen-containing base or a salt of such a base. Accordingly, the improvement in the coating ability as obtained and clamied in the present application can occur independently of the pH of the "cationic emulsion," that is, irrespective of whether the pH is made strongly acid, for instance, where pH equals 1.5, or strongly alkaline, pH, e.g., being equal to 10.0. Thus, in the case of an acid salt of amine or a salt of a quaternary ammonium base, the pH of the emulsion solution must be less than 7.0. On the other hand, in the case of a quaternary nitrogen base, the pH of the emulsion will be greater than 7.0.

Thus, it is the combination of the two surface-active materials in the emulsion, irrespective of whether one of them is primarily considered as the emulsifier and the other primarily considered as the coating aid, or vice versa, which is the critical feature of the present invention.

Although the invention is illustrated in the present specification by examples which involve preparation and testing of emulsions of asphalt, since among emulsified bituminous materials, asphalt emulsions are most frequently used for road construction and repairs, emulsions of other bituminous materials, for instance, those of coal tar, pitch, and the like may be similarly formulated to contain gilsonite nitrogen bases and/or their quaternary derivatives to insure their improved coating of the aggregate and particularly of said and dense-graded aggregate. At this point, it may be noted that penetration of the bitumen (asphalt) is not critical, and any bitumen capable of being emulsified may be used in accordance with the invention in conjunction with the above-described coating-improving additive. Also, the gilsonite nitrogen bases and their quaternary derivatives improve the coating efficiency and adhesion of bitumen (asphalt), in any form, whether emulsified or as a cutback.

The invention contemplates the addition and operativeness in the emulsions of small amounts of conventional additives, such as hydrocarbon diluents, (naphtha and the like), adhesion agents, stabilizers, etc., provided the presence of these additives does not impair the desirable properties and, in particular, the improved coating ability of the emulsions as claimed in the following claims.

We claim:
1. An oil-in-water type mixing-grade cationic bituminous emulsion comprising from about 50 to about 75% by weight of bitumen; from about 0.15 to about 2.0% by weight of an emulsifier selected from the group consisting of materials corresponding to the formulae:

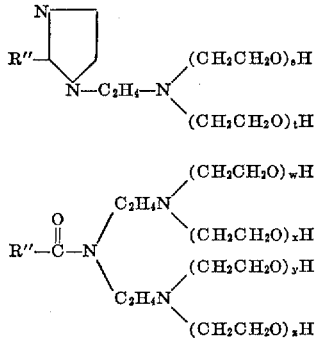

and in which R″ is an alkyl radical containing from 7 to 21 carbon atoms, and $s$ and $t$ are integers, the sum of which equals from about 30 to about 60, and $w$, $x$, $y$ and $z$ are integers, the sum of which equals from about 30 to about 60; from about 0.10 to about 10.0% by weight of a material which aids coating of mineral aggregate and is selected from the group consisting of nitrogen bases and quaternary salts thereof, said nitrogen bases being the amine oil concentrate recovered overhead in the distillation of gilsonite from about 300 to about 750° F. and having a nitrogen content of from about 1.5 to about 10.0%; and water to make up 100% by weight.

2. An oil-in-water-type cationic bituminous emulsion comprising (a) from about 50 to about 75 percent by weight of bitumen; (b) from about 0.15 to about 2 percent by weight of an adduct of from 10 to 90 moles of ethylene oxide and a glyoxalidine substituted with a $C_7$–$C_{21}$ alkyl radical in the 2-position; (c) from about 0.10 to about 10.0 percent by weight of a coating-aid material from the group consisting of nitrogen bases and quaternary salts thereof, said nitrogen bases having been derived from gilsonite as an amine oil overhead distillate thereof, and having a nitrogen content from about 1.5 to about 10.0 percent by weight and water to make up 100 percent by weight.

3. An oil-in-water-type cationic bituminous emulsion as defined in claim 2, wherein said adduct of ethylene oxide and glyoxalidine contains from 30 to 70 moles of ethylene oxide.

References Cited
UNITED STATES PATENTS

| | | | |
|---|---|---|---|
| 2,003,860 | 6/1935 | McConnaughay | 252—311.5 |
| 2,678,316 | 5/1954 | Harris | 260—290 |
| 3,220,953 | 11/1965 | Borgfeldt | 252—311.5 |

RICHARD D. LOVERING, Primary Examiner.

U.S. Cl. X.R.

252—311.5